US008650595B2

(12) United States Patent  
Tomioka (10) Patent No.: US 8,650,595 B2
(45) Date of Patent: Feb. 11, 2014

(54) BROADCAST RECEPTION APPARATUS AND PROGRAM GUIDE CREATION METHOD

(75) Inventor: Yoshiaki Tomioka, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/265,615

(22) PCT Filed: Mar. 26, 2010

(86) PCT No.: PCT/JP2010/002213
§ 371 (c)(1),
(2), (4) Date: Dec. 22, 2011

(87) PCT Pub. No.: WO2010/122713
PCT Pub. Date: Oct. 28, 2010

(65) Prior Publication Data
US 2012/0117597 A1 May 10, 2012

(30) Foreign Application Priority Data
Apr. 23, 2009 (JP) .................. 2009-105302

(51) Int. Cl.
*G06F 3/00* (2006.01)
*G06F 13/00* (2006.01)
*H04N 5/445* (2011.01)

(52) U.S. Cl.
USPC ............... 725/46; 725/37; 725/42; 725/40; 725/39; 725/56

(58) Field of Classification Search
USPC ................. 725/46, 39, 37, 42, 40, 56
See application file for complete search history.

(56) References Cited

U.S. PATENT DOCUMENTS

| 6,446,082 | B1 | 9/2002 | Arita |
| 2003/0177495 | A1 | 9/2003 | Needham et al. |
| 2003/0237097 | A1 | 12/2003 | Marshall et al. |
| 2007/0271582 | A1* | 11/2007 | Ellis et al. .................. 725/46 |
| 2009/0007198 | A1 | 1/2009 | Lavender et al. |

FOREIGN PATENT DOCUMENTS

| JP | 2000-165845 | 6/2000 |
| JP | 2004-96570 | 3/2004 |
| JP | 2004-193920 | 7/2004 |
| JP | 2004-193943 | 7/2004 |
| JP | 2004-194252 | 7/2004 |
| JP | 2002-335463 | 11/2004 |
| JP | 2006-333157 | 12/2006 |
| JP | 2008-22411 | 1/2008 |
| JP | 2008-199345 | 8/2008 |
| WO | 2005/125200 | 12/2005 |

OTHER PUBLICATIONS

Search report from E.P.O., mail date is May 7, 2013.

* cited by examiner

*Primary Examiner* — Jefferey Harold
*Assistant Examiner* — Sihar Karwan
(74) *Attorney, Agent, or Firm* — Greenblum & Bernstein, P.L.C.

(57) ABSTRACT

A broadcast reception apparatus minimizes an access load on a network distribution service provider without complex coordination between a broadcast station and the network distribution service provider. A program information storage stores program information showing the broadcast schedule, a distribution schedule acquirer acquires distribution schedule information for programs scheduled to be distributed, and a judger judges whether to acquire current distribution status information showing the network distribution status, according to the distribution schedule information. When the judger judges that current distribution status information is to be acquired, a distribution status acquirer acquires the current distribution status information, and a program guide creator uses the program information, distribution schedule information, and current distribution status information to create a program guide including information showing the network distribution status in addition to the program information.

12 Claims, 5 Drawing Sheets

BROADCAST RECEPTION APPARATUS AND PROGRAM GUIDE CREATION METHOD

TECHNICAL FIELD

The present invention relates to a broadcast reception apparatus and program guide creation method that have a program guide function and enable broadcast content and network distribution content provided via a two-way network to be played back.

BACKGROUND ART

In recent years, with the rapid progress of digital broadcasting and broadband communications, a demand has arisen for network services using broadcast reception apparatuses such as familiar home TV sets, and broadcast reception apparatuses offering two-way network support have been developed.

Among conventional broadcast reception apparatuses offering two-way network support, a broadcast reception apparatus disclosed in Patent Literature 1 acquires broadcast information for a previously broadcast program provided by two-way network VOD (Video On Demand) or downloading, displays the acquired previously broadcast program information and information for a program scheduled for future broadcasting in the same listing, and provides this listing to a user as a program listing guide (see Patent Literature 1, for example).

CITATION LIST

Patent Literature

PTL 1
Japanese Patent Application Laid-Open No. 2008-22411

SUMMARY OF INVENTION

Technical Problem

However, a problem with the above conventional configuration is that ascertaining the distribution status of a program provided via a network (hereinafter referred to as "network distribution status") is difficult and complicated. Consequently, even if a user selects a program provided via a network from a program listing guide, that program may not actually have been provided via the network, and convenience is lost.

For example, when a previously broadcast program is provided via a network, preparation time for data conversion of the previously broadcast program or the like is necessary according to the distribution status via the network. In this case, there is a period, from the start of program broadcasting until completion of preparations for distribution via the network, during which network distribution of the program is not performed. Also, a network distribution period may be limited due to content provider contract conditions, copyright problems, or the like, and network distribution may be temporarily restricted or a network distribution time limit may be set. For these reasons, a user may not necessarily always be able to view a previously broadcast program via a network when he or she accesses that network.

In Patent Literature 1, a method is disclosed whereby program information for a previously broadcast program is transmitted by means of a broadcast wave as an additional signal for program guide use. Thus, a method can also be conceived of whereby distribution status information for a program provided via a network is transmitted using an additional signal. However, in such a mode, it is necessary for an additional signal transmitted by means of a broadcast wave to be changed according to the status of program distribution via the network. That is to say, close coordination is necessary between a broadcasting facility that sends a broadcast signal (for example, a broadcasting station) and a network distribution facility (for example, a network distribution service provider). However, since a broadcasting facility and network distribution facility may differ in terms of distribution modes and entities, and are often independent, a problem with transmitting a network distribution status as an additional broadcast wave signal is that the configuration becomes complex and complicated.

On the other hand, a method is disclosed in Patent Literature 1 whereby a network distribution service provider provides broadcast information for a previously broadcast program. In a mode of this kind, a broadcast reception apparatus can confirm the latest network distribution status each time it accesses a network distribution service provider. However, in this case, each time a user displays a program guide, it is necessary for a broadcast reception apparatus to access a network distribution service provider in order to confirm the latest network distribution status. As a result, the access load on the network distribution service provider side from a broadcast reception apparatus is heavy, and such a mode is impractical.

It is an object of the present invention to provide a broadcast reception apparatus and program guide creation method that suppress an access load on the network distribution service provider side without performing complex coordination between a broadcasting station providing a program by means of a broadcast wave and a network distribution service provider providing content via a network, and that enable a user to be provided with the distribution status of a program provided via the network.

Solution to Problem

A broadcast reception apparatus according to the present invention employs a configuration to include: a storage section that stores program information showing a broadcasting schedule of a program scheduled to be broadcast; a first acquisition section that acquires distribution schedule information showing a distribution schedule of a program scheduled to be distributed via a network; a determination section that determines whether or not current distribution status information showing the network distribution status is to be acquired according to the distribution schedule information; a second acquisition section that acquires the current distribution status information when the determination section determines that the current distribution status information is to be acquired; and a creation section that uses the program information, the distribution schedule information, and the current distribution status information to create a program guide that includes information showing the network distribution status in addition to the program information.

A program guide creation method according to the present invention include: a step of determining whether or not current distribution status information showing the network distribution status is to be acquired according to distribution schedule information showing a distribution schedule of a program scheduled to be distributed via a network; a step of acquiring the current distribution status information when it is determined that the current distribution status information is to be acquired; and a step of using program information showing a broadcasting schedule of a program scheduled to be broadcast, the distribution schedule information, and the current distribution status information to create a program guide that includes information showing the network distribution status in addition to the program information.

Advantageous Effects of Invention

The present invention suppresses an access load on the network distribution service provider side without performing complex coordination between a broadcasting station providing a program by means of a broadcast wave and a network distribution service provider providing content via a network, and enables a user to be provided with the distribution status of a program provided via the network.

DESCRIPTION OF EMBODIMENTS

Now, embodiments of the present invention will be described in detail with reference to the accompanying drawings.

Embodiment 1

Figure 1:
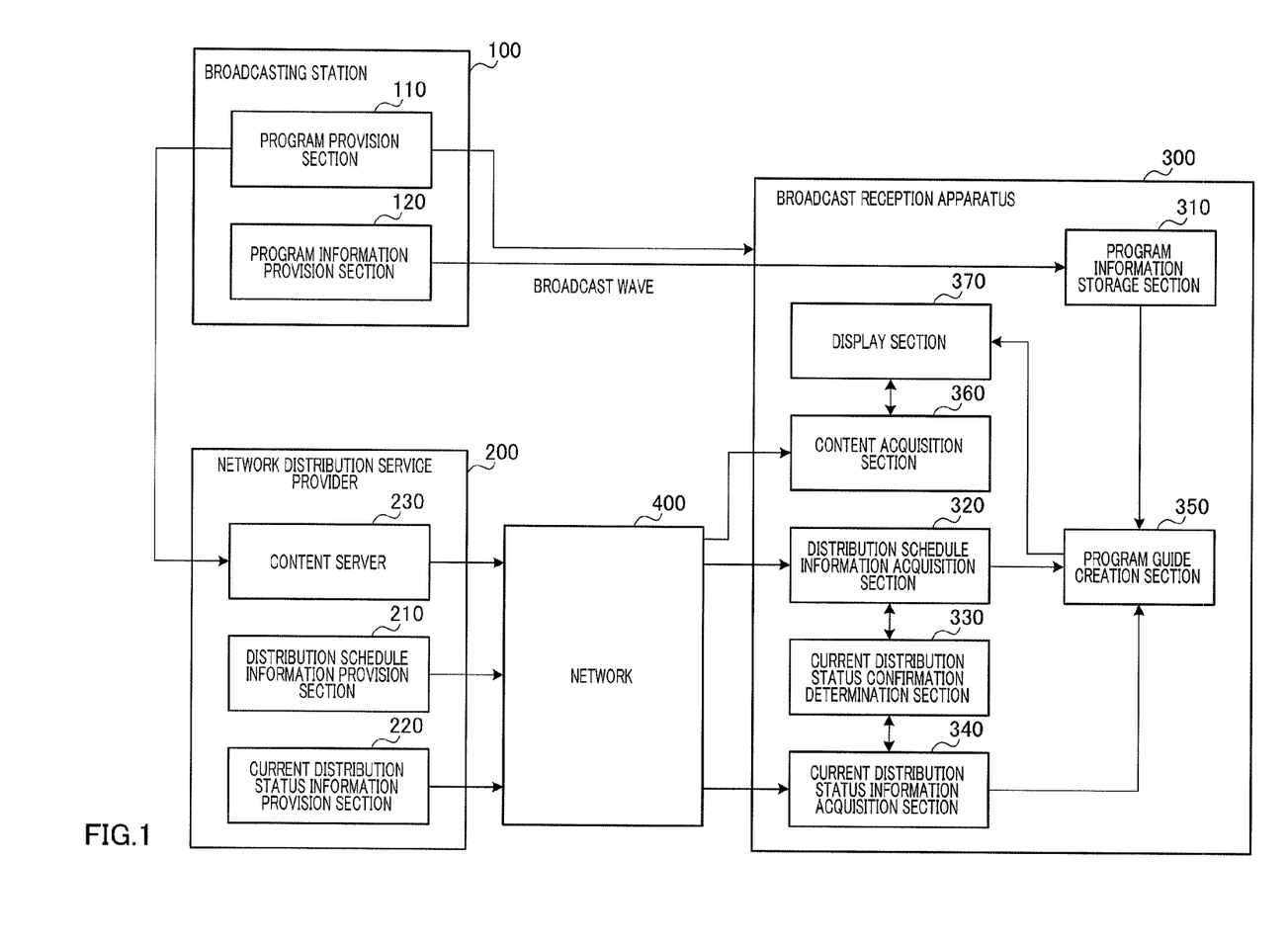
FIG. 1 is a drawing showing the overall configuration of a two-way network supporting system according to Embodiment 1 of the present invention.

FIG. 1 is a drawing showing the overall configuration of a two-way network supporting system according to Embodiment 1 of the present invention.

As shown in FIG. 1, the two-way network supporting system includes broadcasting station 100, network distribution service provider 200, broadcast reception apparatus 300, and network 400.

Broadcasting station 100 is equipped with program provision section 110 and program information provision section 120.

Program provision section 110 transmits a program to broadcast reception apparatus 300 using a broadcast wave. Program provision section 110 also provides network distribution service provider 200 with a previously broadcast program, or a program that has not actually been broadcast but is related to a previously broadcast program, or the like, via the network, for example.

Program information provision section 120 transmits program information showing a broadcasting schedule of programs scheduled to be broadcast to broadcast reception apparatus 300 using a broadcast wave. Program information includes, for example, a program ID identifying a program, a program name, a scheduled broadcast start time, a scheduled broadcast end time, and so forth, as in an EIT (Event Information Table) of SI (Service Information) used in digital broadcasting. In an EIT, an Event ID is included as a program ID.

Network distribution service provider 200 is equipped with distribution schedule information provision section 210, current distribution status information provision section 220, and content server 230.

Via network 400, distribution schedule information provision section 210 provides broadcast reception apparatus 300 with distribution schedule information showing a distribution schedule of programs scheduled to be distributed by content server 230. There is a possibility of programs distributed from content server 230 being changed due to various circumstances, and consequently there is also a possibility of distribution schedule information being changed as occasion arises.

Via network 400, current distribution status information provision section 220 provides broadcast reception apparatus 300 with current distribution status information showing the network distribution status (whether distribution is in progress, has been extended, has ended, and so forth) of a program actually provided from content server 230 via network 400. Current distribution status information is information showing the distribution status of a program currently being distributed by content server 230, a program for which distribution has been stopped, a program for which distribution is scheduled, and so forth. Details of current distribution status information will be given later herein.

Content server 230 stores content of a previously broadcast program, or a program that has not actually been broadcast but is related to a previously broadcast program, or the like, via the network, provided from program provision section 110 of broadcasting station 100, and provides program content to broadcast reception apparatus 300 in accordance with a connection directive from broadcast reception apparatus 300.

Broadcast reception apparatus 300 is equipped with program information storage section 310, distribution schedule information acquisition section 320, current distribution status confirmation determination section 330, current distribution status information acquisition section 340, program guide creation section 350, content acquisition section 360, and display section 370.

Program information storage section 310 stores program information sent from broadcasting station 100 by means of a broadcast wave.

Distribution schedule information acquisition section 320 acquires distribution schedule information provided from distribution schedule information provision section 210 via network 400.

Figure 3:
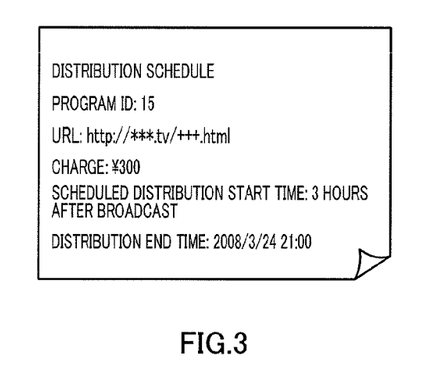
FIG. 3 is a drawing showing an example of distribution schedule information in Embodiment 1.

FIG. 3 is a drawing showing an example of distribution schedule information. As shown in FIG. 3, distribution schedule information includes a program ID identifying a program, a scheduled distribution start time and distribution end time of a program provided from content server 230 via network 400, charge information when network distribution is used, network connection destination information, and so forth. In the example shown in FIG. 3, it is shown that a program having program ID "15" is subject to network distribution from 3 hours after the time at which that program is broadcast until "2008/3/24 21:00".

Distribution schedule information acquisition section 320 accesses network distribution service provider 200 and acquires distribution schedule information once a day, for example.

Current distribution status confirmation determination section 330 determines whether or not current distribution status information is to be acquired according to the above information included in distribution schedule information. Current distribution status confirmation determination section 330 determination methods will be described later herein.

If current distribution status confirmation determination section 330 determines that current distribution status information is to be acquired, current distribution status information acquisition section 340 acquires current distribution status information. Current distribution status information includes a confirmed distribution start time and distribution end time in addition to a program ID. If distribution has not been confirmed, or if the original distribution schedule has been changed, current distribution status information includes the latest scheduled distribution start time and distribution end time. The format of current distribution status information may be the same as the format of distribution schedule information shown in FIG. 3, with provision being made for the latest information to be reflected.

Program guide creation section 350 combines program information, distribution schedule information, and current distribution status information, and creates distribution information for programs provided from content server 230 as a program guide.

Figure 4:
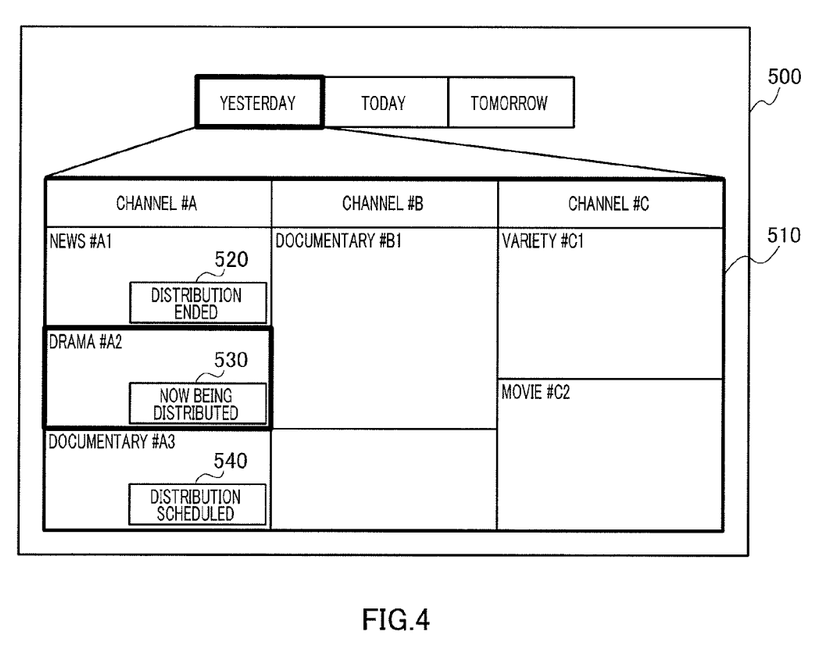
FIG. 4 is a drawing showing an example of a program guide in Embodiment 1.

FIG. 4 is a drawing showing an example of program guide 500 created by program guide creation section 350. In FIG. 4, of broadcast programs broadcast "yesterday", broadcast programs broadcast "today", and broadcast programs broadcast "tomorrow", program listing 510 displays part of program information broadcast "yesterday" on channel #A, channel #B, and channel #C. Program guide creation section 350 creates program listing 510 using program information.

Also, in FIG. 4, information 520, information 530, and information 540 are information showing a network distribution status, and program guide creation section 350 displays these items of information superimposed on program listing 510 according to distribution schedule information and current distribution status information.

Specifically, program guide creation section 350 compares the current time with a distribution start time or distribution end time of current distribution status information, and creates program guide 500 displaying information 540 showing "Distribution scheduled" for a program for which network distribution has not started, displaying information 530 showing "Now being distributed" for a program for which network distribution is being performed, and displaying information 520 showing "Distribution ended" for a program for which network distribution has ended.

If a user selects a program for which information 540 showing "Distribution scheduled" is displayed, provision may be made for program guide creation section 350 to display a scheduled time at which viewing will be possible (scheduled distribution start time) in the program guide.

If a user selects a program for which information 530 showing "Now being distributed" is displayed, content acquisition section 360 immediately accesses connection destination information for that program and acquires network-distributed program content (hereinafter referred to as "network distribution program content"). If a user selects a program for which information 540 showing "Distribution scheduled" is displayed, content acquisition section 360 makes a network distribution program content acquisition reservation or the like.

Display section 370 displays broadcast program content, network distribution program content, a program guide, and so forth, on a screen.

Figure 2:
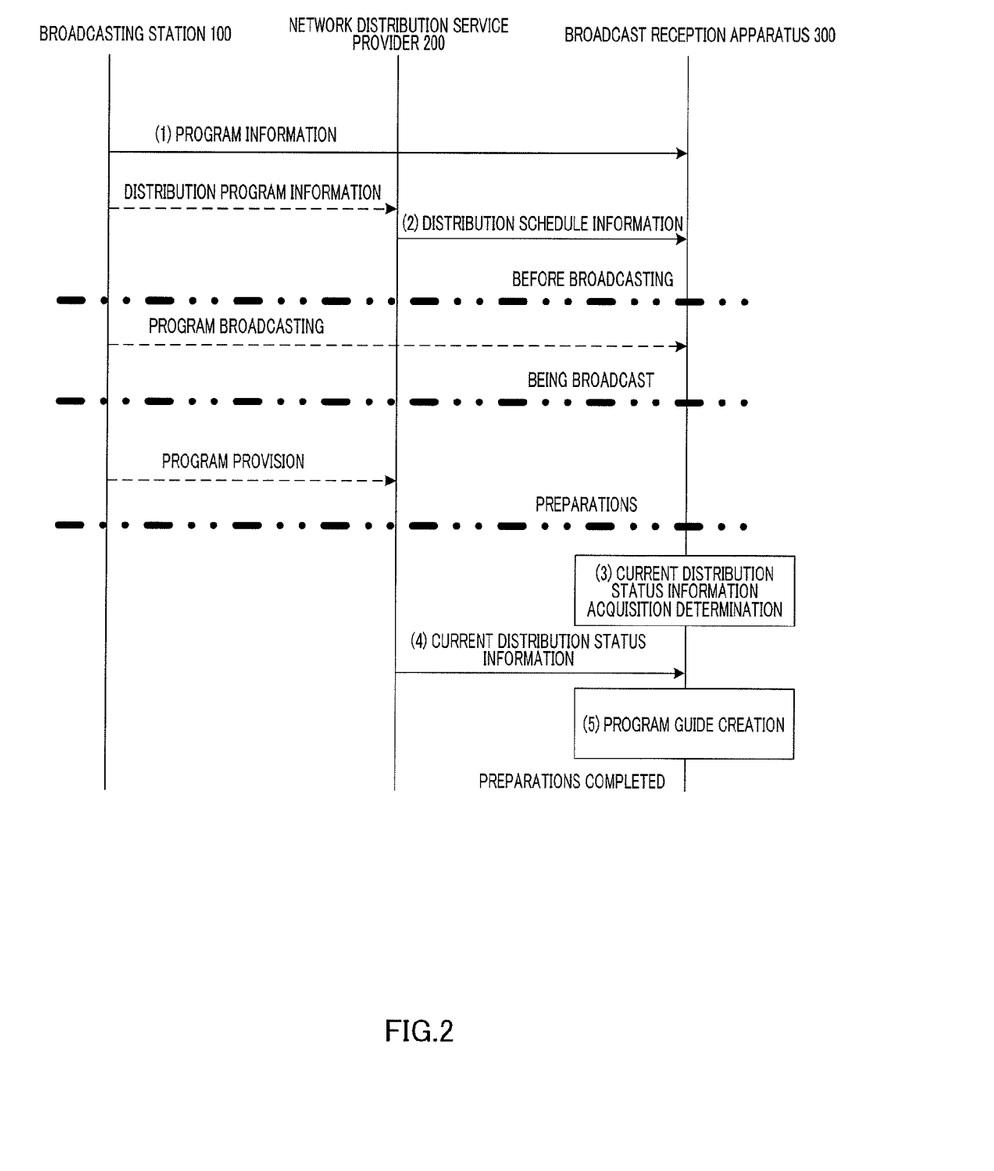
FIG. 2 is a data flowchart for explaining the operation of a broadcast reception apparatus in Embodiment 1.

The operation of broadcast reception apparatus 300 configured as described above will now be explained using FIG. 2. FIG. 2 is a drawing showing the data flow of a two-way network supporting system according to this embodiment.

[1] Program information storage section 310 of broadcast reception apparatus 300 first receives program information transmitted from broadcasting station 100 using a broadcast wave, and stores the received program information.

[2] Next, distribution schedule information acquisition section 320 of broadcast reception apparatus 300 acquires distribution schedule information provided from network distribution service provider 200 via network 400.

[3] With a user's program guide display directive to broadcast reception apparatus 300 or the like as a trigger, current distribution status confirmation determination section 330 of broadcast reception apparatus 300 determines whether or not current distribution status information is to be acquired. Current distribution status confirmation determination section 330 determination methods (1), (2), (3), and (4) are described below.

(1) Current distribution status confirmation determination section 330 determines that current distribution status information is to be acquired only if, as shown in FIG. 4 for example, a user displays a program guide that includes past programs that have already been broadcast and there is information showing the network distribution status for past programs included in the displayed program guide.

It is very possible that network-distributed programs are not all previously broadcast programs, but are limited to some thereof. Therefore, even if a program is a past program, it is not necessarily network-distributed. Consequently, if current distribution status information acquisition section 340 always acquires current distribution status information when a past program is displayed in a program guide, access is performed to network distribution service provider 200 from broadcast reception apparatus 300 even in the case of a program not scheduled for distribution in the first place, and an unnecessary load may be imposed on network distribution service provider 200.

On the other hand, if broadcast reception apparatus 300 acquires current distribution status information only if there is information showing the network distribution status for a past program included in a displayed program guide, as described above, an increase in the number of accesses to network distribution service provider 200 from broadcast reception apparatus 300 can be reduced.

(2) Current distribution status confirmation determination section 330 compares the current time with a scheduled start time included in distribution schedule information, and determines that current distribution status information is to be acquired only in the case of a program whose scheduled start time is later than the current time, or if the scheduled start time is close to the current time.

As a result of having current distribution status confirmation determination section 330 use a scheduled start time of a program included in distribution schedule information to determine whether or not current distribution status information is to be acquired in this way, current distribution status information acquisition section 340 acquires current distribution status information only when necessary, enabling an increase in the number of accesses to network distribution service provider 200 from broadcast reception apparatus 300 to be reduced.

(3) Current distribution status confirmation determination section 330 stores a user's viewing history or the like beforehand, uses the user's viewing history to determine whether or not there is a high possibility of the user viewing with interest, and determines that current distribution status information is to be acquired if a program likely to be viewed with interest by the user is included in distribution schedule information.

As a result of having current distribution status confirmation determination section 330 determine whether or not a program included in distribution schedule information matches a user's tastes and has a high possibility of being viewed by the user in this way, current distribution status information acquisition section 340 acquires current distribution status information only when necessary, enabling an increase in the number of accesses to network distribution service provider 200 from broadcast reception apparatus 300 to be reduced.

(4) Current distribution status confirmation determination section 330 determines that current distribution status information is to be acquired if a program for which there is a possibility of the broadcasting schedule being changed is included in a program guide. For example, the broadcast time of a baseball game or suchlike sports program may be extended if the game has not finished by the scheduled broadcast end time, and there is a possibility of the broadcast start time of a program to be broadcast after such a program being delayed beyond the scheduled start time. Thus, if a program broadcast after a program for which there is a possibility of the broadcasting schedule being changed, such as by extension of the broadcast time, is scheduled for network distribution, current distribution status confirmation determination section 330 considers the possibility of the network distribution start time being changed to be high, and determines that current distribution status information is to be acquired.

As a result of having current distribution status confirmation determination section 330 determine whether or not a program is likely to cause a change in the broadcasting schedule of programs included in distribution schedule information in this way, current distribution status information acquisition section 340 acquires current distribution status information only when necessary, enabling an increase in the number of accesses to network distribution service provider 200 from broadcast reception apparatus 300 to be reduced.

As described above, current distribution status confirmation determination section 330 determines whether or not current distribution status information is to be acquired, and current distribution status information acquisition section 340 executes [4] only if current distribution status confirmation determination section 330 determines that acquisition of current distribution status information is necessary.

[4] Current distribution status information acquisition section 340 acquires current distribution status information.

[5] Using a program ID identifying a program, program guide creation section 350 links program information stored in [1], distribution schedule information acquired in [2], and current distribution status information acquired in [4], and creates a program guide that includes information showing the network distribution status.

As described above, according to this embodiment, program information storage section 310 stores program information showing a broadcasting schedule of a program scheduled to be broadcast, distribution schedule information acquisition section 320 acquires distribution schedule information showing a distribution schedule of a program scheduled to be broadcast via a network, current distribution status confirmation determination section 330 determines whether or not current distribution status information showing the network distribution status is to be acquired according to distribution schedule information, current distribution status information acquisition section 340 acquires current distribution status information if current distribution status confirmation determination section 330 determines that current distribution status information is to be acquired, and program guide creation section 350 uses program information, distribution schedule information, and current distribution status information to create a program guide that includes information showing the network distribution status in addition to program information.

By this means, the access load on network distribution service provider 200 from broadcast reception apparatus 300 is suppressed without complex coordination being performed between broadcasting station 100 and network distribution service provider 200, broadcast reception apparatus 300 can provide a user with a program guide that includes a network distribution status, and a user can select a program while confirming the network distribution status in the program guide.

Embodiment 2

Figure 5:
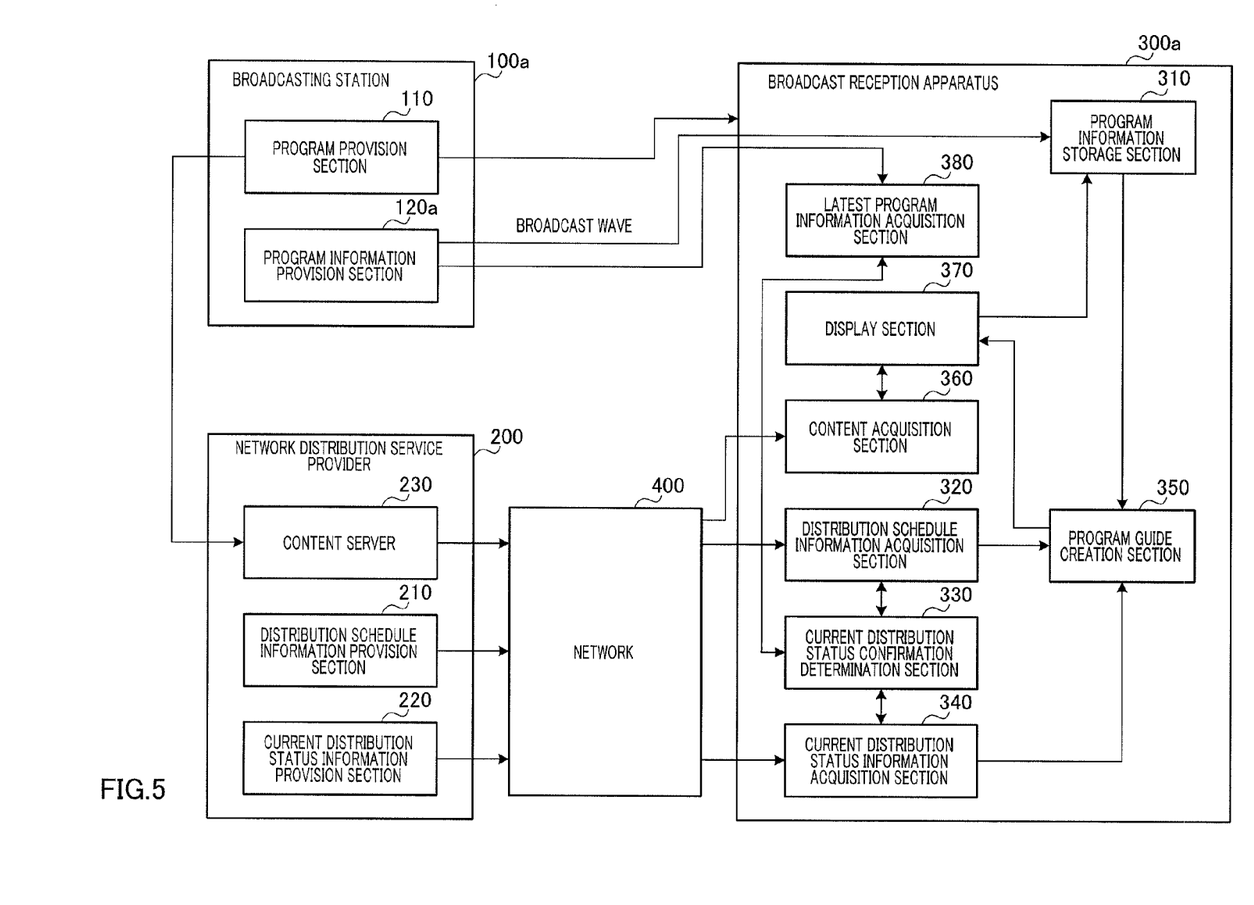
FIG. 5 is a drawing showing the overall configuration of a two-way network supporting system according to Embodiment 2 of the present invention.

FIG. 5 is a drawing showing the overall configuration of a two-way network supporting system according to Embodiment 2 of the present invention. In the two-way network supporting system according to this embodiment in FIG. 5, configuration parts common to FIG. 1 are assigned the same reference codes as in FIG. 1, and descriptions thereof are omitted here.

Broadcasting station 100*a* in FIG. 5 is equipped with program information provision section 120*a* instead of program information provision section 120 of broadcasting station 100 in FIG. 1.

Program information provision section 120*a* transmits program information showing a broadcasting schedule of programs scheduled to be broadcast, and latest program information showing information for programs that are being broadcast or have been broadcast, to broadcast reception apparatus 300*a* using a broadcast wave. Latest program information includes, in the same way as program information, a program ID identifying a program, a program name, and an actual broadcast start time and scheduled broadcast end time (or broadcast end time) of a program currently being broadcast or a previously broadcast program.

Program information provision section 120*a* provides latest program information to network distribution service provider 200, and network distribution service provider 200 aggregates latest program information, and provision may also be made for network distribution service provider 200 to provide aggregated latest program information to broadcast reception apparatus 300*a* via network 400.

Broadcast reception apparatus 300*a* in FIG. 5 employs a configuration in which latest program information acquisition section 380 has been added to the configuration elements of broadcast reception apparatus 300 in FIG. 1.

Latest program information acquisition section 380 acquires a broadcast start time from latest program information showing information for programs that are currently being broadcast or have previously been broadcast, and updates a broadcast start time of program information stored in program information storage section 310 to an actual broadcast start time.

As a result of having latest program information acquisition section 380 update a program information broadcast start time to an actual broadcast start time in this way, program guide creation section 350 can create program listing 510 based on an actual broadcast start time even if a broadcasting schedule is changed from the original schedule due to extension of a live sports broadcast or an unscheduled news bulletin, for example.

Also, for a channel that provides a program whose broadcasting schedule has been changed, there is a high possibility of broadcast start times of subsequent programs being changed, and in line with this, a high possibility of a network distribution schedule being changed. Thus, providing for program information to be updated to the latest information enables current distribution status confirmation determination section 330 to predict a change in a network distribution schedule, and determine whether or not current distribution status information is to be acquired, allowing broadcast reception apparatus 300*a* to acquire the distribution status of a program provided via the network while reducing an increase in the number of accesses to network distribution service provider 200 from broadcast reception apparatus 300*a*. By this means, a user can select a program while confirming the network distribution status in a program guide that accords with an actual broadcasting schedule.

Embodiment 3

The configuration of a two-way network supporting system according to Embodiment 3 of the present invention is similar to that of Embodiment 1, and therefore a description thereof is omitted here. This embodiment differs from Embodiment 1 and Embodiment 2 in that distribution schedule information and current distribution status information include a distribution information type.

Figure 6:
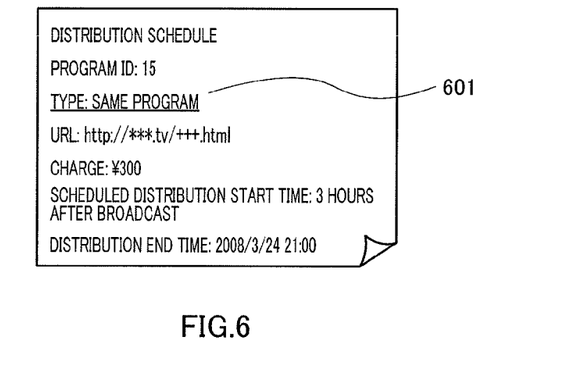
FIG. 6 is a drawing showing an example of distribution schedule information in Embodiment 2.

FIG. 6 is a drawing showing an example of the configuration of distribution schedule information in this embodiment. The distribution schedule information in FIG. 6 includes distribution information type 601 in addition to the items included in the distribution schedule information in FIG. 3. As this distribution information type, distribution schedule information is classified as either information for the "same program" as a program identified by a program ID, or "related program" information.

Specifically, when distribution type information is "same program", distribution schedule information shows the network distribution status of the same program as that of the program ID. For example, if the contents of program content identified by a program ID are "Drama A, 2nd episode", and distribution type information is "same program", distribution schedule information shows the distribution schedule of "Drama A, 2nd episode".

On the other hand, when distribution type information is "related program", distribution schedule information shows the network distribution status of a program ID related program. For example, if the contents of program content identified by a program ID are "Drama A, 2nd episode", and distribution type information is "related program", distribution schedule information shows the distribution schedule of programs "Drama A, 1st episode", "Drama A, 3rd episode", "Drama A, 3rd episode preview", and "Drama A, omnibus edition", which are programs related to "Drama A, 2nd episode".

The format of current distribution status information may be the same as the format of distribution schedule information shown in FIG. 6, with provision being made for the latest information to be reflected.

Program guide creation section 350 displays distribution type information included in a program guide.

Figure 7:
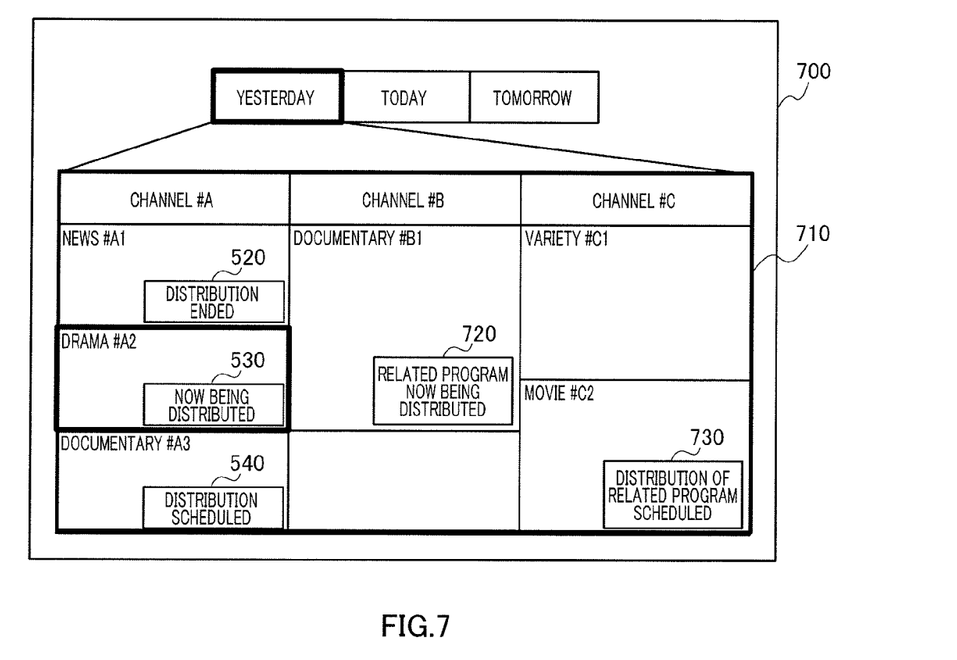
FIG. 7 is a drawing showing an example of a program guide in Embodiment 2.

FIG. 7 is a drawing showing an example of program guide 700 created using distribution schedule information that includes distribution type information. Elements in FIG. 7 identical to those in FIG. 4 are assigned the same reference codes as in FIG. 4, and descriptions thereof are omitted here.

In FIG. 7, of broadcast programs broadcast "yesterday", broadcast programs broadcast "today", and broadcast programs broadcast "tomorrow", program listing 710 displays part of program information broadcast "yesterday" on channel #A, channel #B, and channel #C.

Also, in FIG. 7, information 520, information 530, and information 540 are information showing a network distribution status, and these items of information are displayed superimposed on program listing 710 according to distribution schedule information and current distribution status information. Information 520, information 530, and information 540 are information showing a network distribution status created when distribution type information included in distribution schedule information is "same program".

That is to say, for channel #A programs, "same program distribution ended" is shown for "News #A1", "same program now being distributed" for "Drama #A2", and "same program distribution scheduled" for "Documentary #A3". By this means, a user knows that a program for which broadcasting has already ended is being distributed via a network, and therefore even if a user has missed a broadcast program, the user can select the missed program from the program guide.

Also, in FIG. 7, information 720 is information displayed when distribution schedule information is provided in which a program ID is the same as a program ID identifying "Documentary #B1" on channel #B and distribution type information is "related program", program guide creation section 350 compares the current time with the distribution start time and distribution end time of current distribution status information, and determines that "Documentary #B1" is being network-distributed.

Furthermore, in FIG. 7, information 730 is information displayed when distribution schedule information is provided in which a program ID is the same as a program ID identifying "Movie #C2" on channel #C and distribution type information is "related program", program guide creation section 350 compares the current time with the distribution start time and distribution end time of current distribution status information, and determines that network distribution of "Movie #C2" has not yet been started.

Thus, using distribution schedule information that includes distribution type information enables program guide creation section 350 to create a program guide indicating "related program now being distributed" for "Documentary #B1" on channel #B and "distribution of related program scheduled" for "Movie #C2" on channel #C. Consequently, having more interest in programs included in a program guide, a user can select an omnibus edition, a program broadcast in the past, a program preview, or the like, from the program guide.

As described above, according to this embodiment, distribution schedule information or current distribution status information includes a program ID identifying a program, and distribution type information showing whether information shown by distribution schedule information or current distribution status information is information for the same program as that of the program ID or a related program, and program guide creation section 350 uses distribution type information to create a program guide that includes information showing the network distribution status of a related program.

By this means, the access load on network distribution service provider 200 from broadcast reception apparatus 300 is suppressed without complex coordination being performed between broadcasting station 100 and network distribution service provider 200, broadcast reception apparatus 300 can provide a user with a program guide that includes a network distribution status of a related program in addition to a network distribution status of a program that is the same as a broadcast program that has already been broadcast, and a user can select a related program in addition to the same program while confirming the network distribution status in the program guide.

In the above description, cases have been described in which a distribution start time (or scheduled distribution start time) and distribution end time (or scheduled distribution end time) are included in current distribution status information and distribution schedule information, but provision may also be made for a distribution start time and a period from a distribution start time until the end to be included. Also, in the above description, broadcasting is equivalent to IP (Internet Protocol) multicast broadcasting using IP multicasting. Furthermore, in FIG. 1, a broadcasting station and a network distribution service provider are shown as being separate, but the same business operator may also perform broadcasting and network distribution.

In the present invention, cases have been described by way of example in which a user selects a program using a program guide in which a list of programs that are scheduled to be broadcast or that have already been broadcast constitutes a program listing, but a program guide in which a list of recorded content constitutes a program listing may also be used. By this means, a user can use a program without knowing whether it is a recorded program or a program distributed via a network.

The disclosure of Japanese Patent Application No. 2009-105302, filed on Apr. 23, 2009, including the specification, drawings and abstract, is incorporated herein by reference in its entirety.

INDUSTRIAL APPLICABILITY

The present invention is suitable for use as a broadcast reception apparatus and program guide creation method having a program guide function and capable of playing back broadcast content and network distribution content provided via a two-way network, such as a network television, a network television (including IPTV (Internet Protocol Television)) compatible set-top box, or PC (Personal Computer) software, and the like.

REFERENCE SIGNS LIST 100, 100a Broadcasting station
110 Program provision section
120, 120a Program information provision section
200 Network distribution service provider
210 Distribution schedule information provision section
220 Current distribution status information provision section
230 Content server
300, 300a Broadcast reception apparatus
310 Program information storage section
320 Distribution schedule information acquisition section
330 Current distribution status confirmation determination section
340 Current distribution status information acquisition section
350 Program guide creation section
360 Content acquisition section
370 Display section

The invention claimed is:

1. A broadcast reception apparatus that receives broadcast program contents that are broadcast from a broadcasting station and receives network distribution program contents that are distributed from a network distribution service provider, the broadcast reception apparatus comprising:
  a storage that stores program information received from the broadcasting station, program information indicating a broadcasting schedule of a program scheduled to be broadcast by the broadcasting station;
  a first acquirer that acquires distribution schedule information received via a network from the network distribution service provider without being transmitted through the broadcasting station, the distribution schedule information indicating a distribution schedule including a scheduled distribution start time and a scheduled distribution end time of a program scheduled to be distributed via the network by the network distribution service provider;
  a determiner that determines whether or not current distribution status information, indicating a latest distribution schedule, is to be acquired via the network from the network distribution service provider according to the distribution schedule of the distribution schedule information;
  a second acquirer that acquires the current distribution status information via the network from the network distribution service provider without being transmitted through the broadcasting station, when the determiner determines that the current distribution status information is to be acquired;
  a creator that creates a program guide by using the program information, and superimposes information indicating a network distribution status on each program in the program guide based on the distribution schedule, information and the current distribution status information; and
  a display that displays the broadcast program contents, the network distribution program contents and the program guide.

2. The broadcast reception apparatus according to claim 1, wherein the determiner determines that the current distribution status information is to be acquired only if a past program that has already been broadcast is included in the displayed program guide.

3. The broadcast reception apparatus according to claim 1, wherein the determiner determines that the current distribution status information is to be acquired if a current time is later than or close to the scheduled distribution start time included in the distribution schedule information.

4. The broadcast reception apparatus according to claim 1, wherein the determiner determines that the current distribution status information is to be acquired if a program likely to be viewed by a user is included in the program guide displayed by a user.

5. The broadcast reception apparatus according to claim 1, wherein the determiner determines that the current distribution status information is to be acquired if a program for which there is a possibility of the broadcasting schedule being changed is included in the program guide displayed by a user.

6. The broadcast reception apparatus according to claim 1, further comprising a third acquirer that acquires latest program information that includes a broadcast start time of a program for which broadcasting has started or broadcasting has ended,
  wherein the determiner determines whether or not the distribution status information is to be acquired according to the distribution schedule information and the latest program information.

7. The broadcast reception apparatus according to claim 1, wherein:

the distribution schedule information or the current distribution status information includes a program ID identifying a program and distribution type information;

the distribution type information indicates whether information indicated by the distribution schedule information or the current distribution status information is information for a program identical to the program of the program ID or information for a related program; and the creator uses the distribution type information to create the program guide that includes information indicating the network distribution status of the related program.

8. A program guide creation method for a broadcast reception apparatus that receives broadcast program contents from a broadcasting station and receives network distribution program contents from a network distribution service provider, the method comprising:

acquiring distribution schedule information received via a network from the network distribution service provider without being transmitted through the broadcasting station, the distribution schedule information indicating a distribution schedule including a scheduled distribution start time and a scheduled distribution end time of a program scheduled to be distributed via the network by the network distribution service provider;

determining whether or not current distribution status information, indicating a latest distribution schedule, is to be acquired via the network from the network distribution service provider according to the distribution schedule of the distribution schedule information;

acquiring the current distribution status information via the network from the network distribution service provider without being transmitted through the broadcasting station, when it is determined that the current distribution status information is to be acquired;

creating a program guide using program information, indicating a broadcasting schedule of a program scheduled to be broadcast by the broadcasting station, the program information being received from the broadcasting station; and superimposing information indicating a network distribution status on each program in the program guide based on the distribution schedule, information and the current distribution status information.

9. The broadcast reception apparatus according to claim 1, wherein the distribution schedule further includes a program ID identifying the program scheduled to be distributed via a network by the network distribution service provider.

10. The broadcast reception apparatus according to claim 1, wherein the program information is received from the broadcasting station without being transmitted through the distribution service provider.

11. The broadcast reception apparatus according to claim 2, wherein the creator superimposes the network distribution status on the past program, to indicate that the past program is currently available via the network by the network distribution service provider.

12. The broadcast reception apparatus according to claim 1, further comprising an inputter that inputs an instruction to display the program guide, wherein the first acquirer acquires the network distribution schedule information periodically, and the determiner determines whether the current distribution status information is to be acquired upon receiving the instruction to display the program guide.

\* \* \* \* \*